(12) United States Patent
Egashira et al.

(10) Patent No.: US 7,483,503 B2
(45) Date of Patent: Jan. 27, 2009

(54) WIRELESS COMMUNICATION USING A PLURALITY OF ANTENNAS

(75) Inventors: Yoshimasa Egashira, Kawasaki (JP); Daisuke Takeda, Kawasaki (JP); Tsuguhide Aoki, Kawasaki (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 547 days.

(21) Appl. No.: 11/147,321

(22) Filed: Jun. 8, 2005

(65) Prior Publication Data

US 2005/0276349 A1 Dec. 15, 2005

(30) Foreign Application Priority Data

Jun. 9, 2004 (JP) ............................. 2004-171669

(51) Int. Cl.
  H04B 7/02 (2006.01)
  H04B 7/08 (2006.01)
  H04L 1/02 (2006.01)
  H04L 27/00 (2006.01)

(52) U.S. Cl. ...................... 375/347; 375/299; 375/267; 455/132

(58) Field of Classification Search ................. 375/299, 375/347, 267; 455/132
See application file for complete search history.

(56) References Cited

U.S. PATENT DOCUMENTS

2001/0028637 A1* 10/2001 Abeta et al. ................. 370/335
2004/0162021 A1* 8/2004 Seki et al. .................... 455/39
2004/0233838 A1 11/2004 Sudo et al.
2005/0105460 A1* 5/2005 Suh et al. .................... 370/203
2005/0265472 A1* 12/2005 Takeda et al. ............... 375/267

OTHER PUBLICATIONS

U.S. Appl. No. 11/147,321, filed Jun. 8, 2005, Egashira et al.
U.S. Appl. No. 11/201,385, filed Aug. 11, 2005, Aoki.
Myeongchoel Shin, et al., "Enhanced Channel-Estimation Technique for MIMO-OFDM Systems", IEEE Transactions on Vehicular Technology, vol. 53, No. 1, Jan. 2004, 2 cover pages and pp. 261-265.
Gordon L. Stuber, et al., "Broadband MIMO-OFDM Wireless Communications", Proceedings of the IEEE, vol. 92, No. 2, Feb. 2004, pp. 271-294.
Sumei Sun Wiemer, et al., "Training Sequence Assisted Channel Estimation for MIMO OFDM", Wireless Communications and Networking, vol. 1, Mar. 20, 2003, 1 cover page and pp. 38-43.
Jan Boer, et al., "Backwards Compatibility: How to Make a MIMO-OFDM System Backwards Compatible and Coexistence with 11a/g at the Link Level.", IEEE 802.11-03/714r0, Sep. 2003.

* cited by examiner

Primary Examiner—David C. Payne
Assistant Examiner—Brian J Stevens
(74) Attorney, Agent, or Firm—Oblon, Spivak, McClelland, Maier & Neustadt, P.C.

(57) ABSTRACT

A wireless communication apparatus includes a plurality of antennas, transmits a plurality of known symbol sequences each including a plurality of known symbols by using the antennas, each of the known symbols having subcarrier arrangement on which plural known information of the each of the known symbols are carried on, and inversion/non-inversion of a phase of known information on one of two adjacent subcarriers of the subcarrier arrangement being controlled in accordance with the number of the known symbols and time position of the each of the known symbols, and transmits data symbols by using the antennas after the known symbol sequences are transmitted.

10 Claims, 10 Drawing Sheets

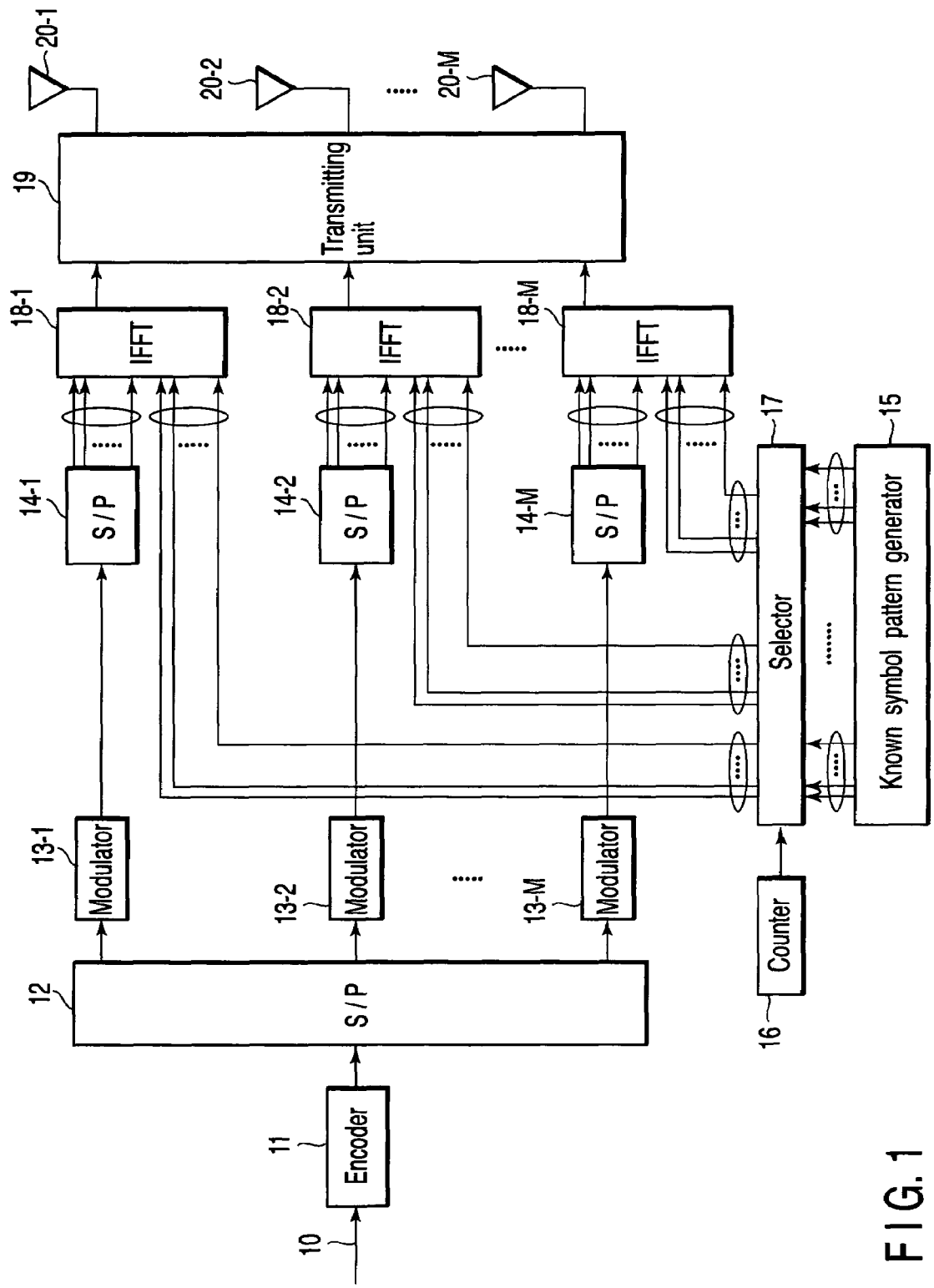
F I G. 1

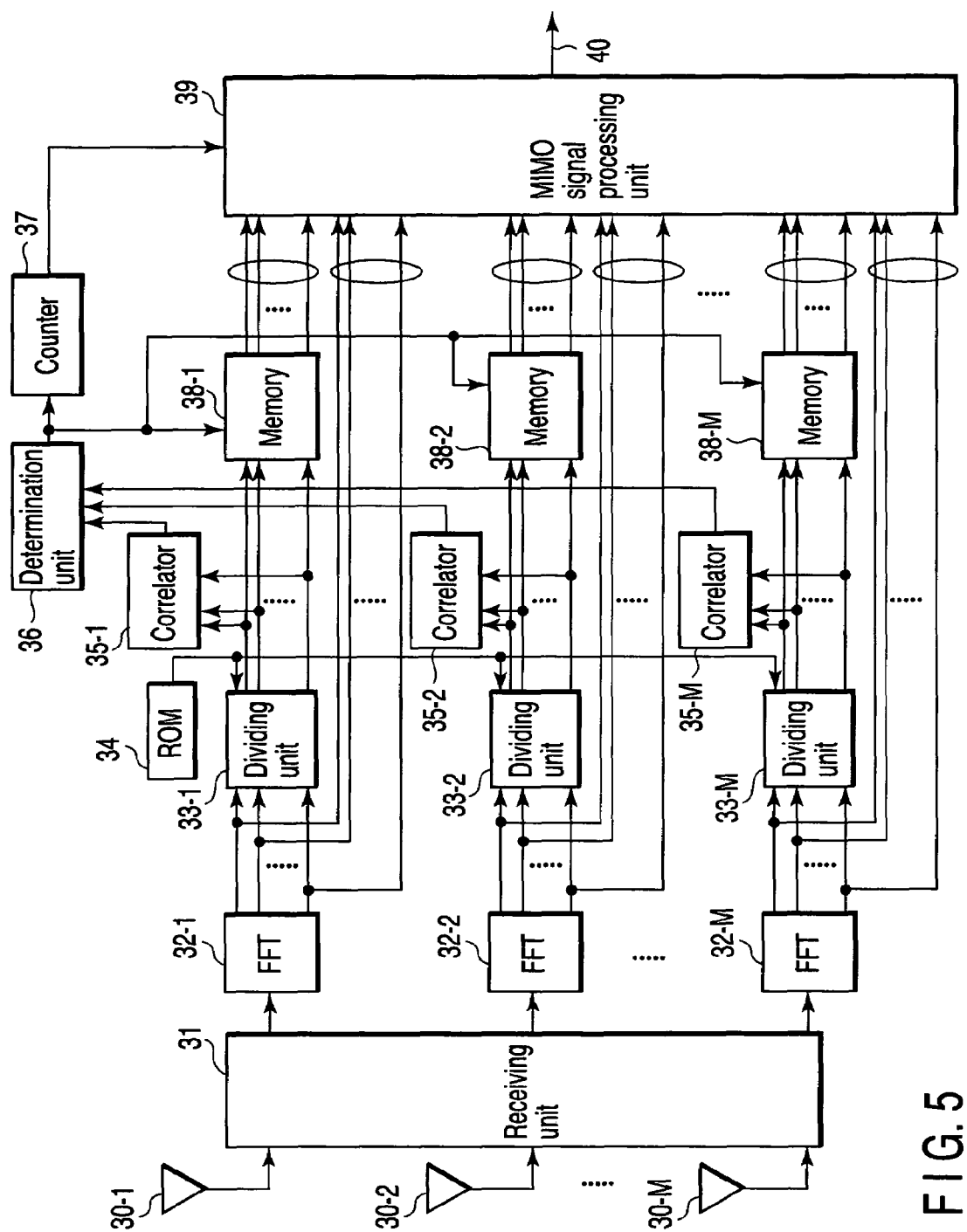
F I G. 5

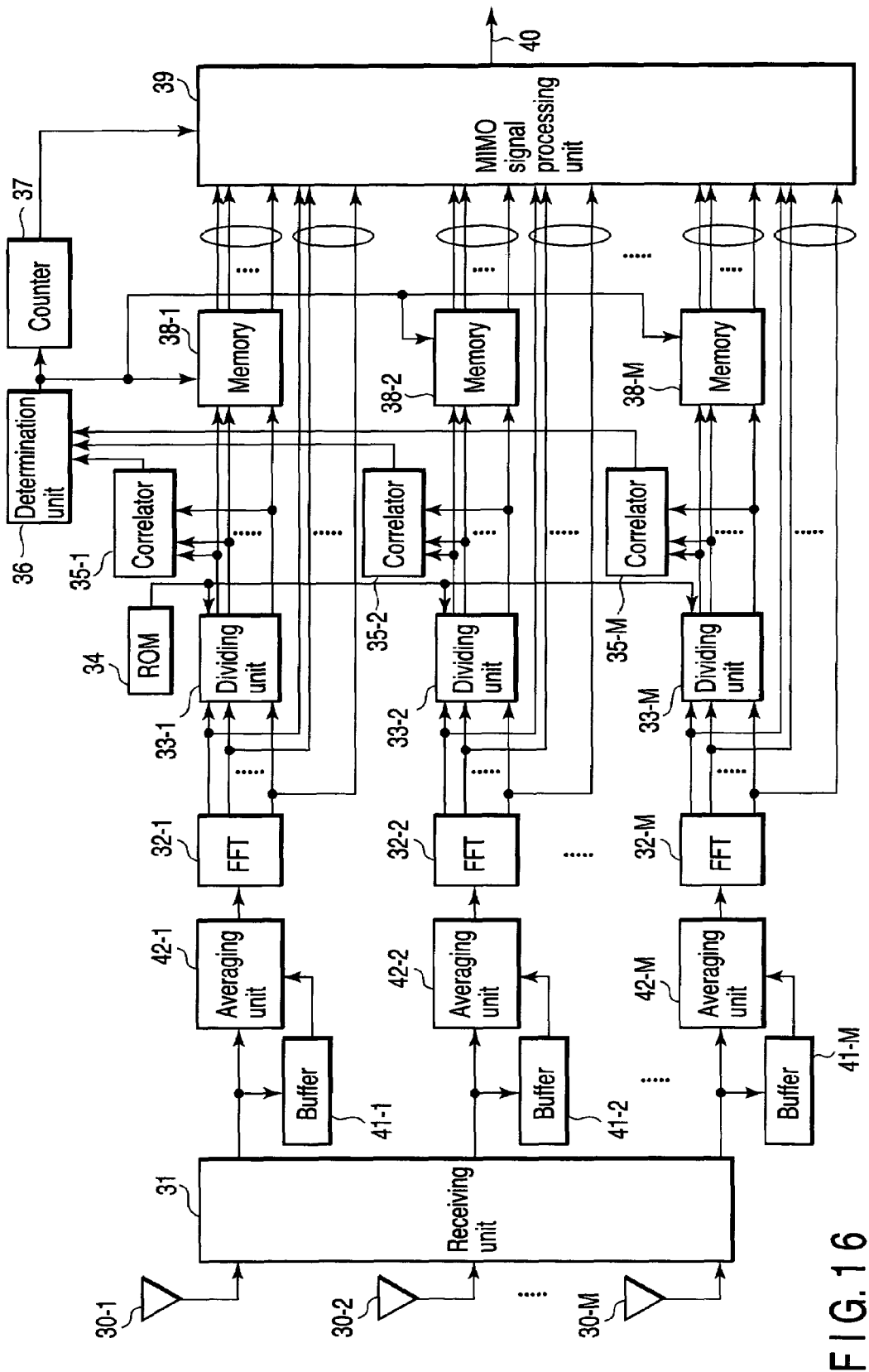
F I G. 16

|  | Symbol 1 | Symbol 2 | Symbol 3 | ..... | Symbol M-1 | Symbol M |
|---|---|---|---|---|---|---|
| Antenna 1 | Pattern 1 | Pattern 2 | Pattern 3 | ..... | Pattern M-1 | Pattern M' |
| Antenna 2 | Pattern 2 | Pattern 3 | Pattern 4 | ..... | Pattern M | Pattern 1' |
| Antenna 3 | Pattern 3 | Pattern 4 | Pattern 5 | ..... | Pattern 1 | Pattern 2' |
| ... | ... | ... | ... | ..... | ... | ... |
| Antenna M-1 | Pattern M-1 | Pattern M | Pattern 1 | ..... | Pattern M-3 | Pattern M-2' |
| Antenna M | Pattern M | Pattern 1 | Pattern 2 | ..... | Pattern M-2 | Pattern M-1' |

FIG. 17

WIRELESS COMMUNICATION USING A PLURALITY OF ANTENNAS

CROSS-REFERENCE TO RELATED APPLICATIONS

This application is based upon and claims the benefit of priority from prior Japanese Patent Application No. 2004-171669, filed Jun. 9, 2004, the entire contents of which are incorporated herein by reference.

BACKGROUND OF THE INVENTION

1. Field of the Invention

The present invention relates to Multi-Input Multi-Output Orthogonal Frequency Division Multiplexing (MIMO-OFDM) for communication using a plurality of antennas and a plurality of subcarriers, and also relates to the technique of a high-speed wireless LAN.

2. Description of the Related Art

In the conventional wireless LAN (802.11a), synchronous processing and channel estimation are performed by transmitting known symbols (a short preamble and long preamble) before a data field. By using these preambles, the subsequent signal and data can be demodulated. Recently, a high-speed wireless LAN standard called IEEE802.11n is being discussed. To achieve a transmission rate of 100 Mbps in a MAC layer, the IEEE802.11n is based on MIMO (Multi-Input Multi-Output) using a plurality of antennas. When the conventional preamble structures of this wireless LAN are to be applied to the MIMO system, therefore, the arrangements of a short preamble and long preamble must be changed to those for MIMO.

In a preamble structure proposed in a reference (Jan Boer and two other persons, "Backwards compatibility", [online], September 2003, IEEE LMSC (publisher), [searched Sep. 15, 2003], Internet <URL: ftp://ieee.wireless@ftp.802wirelessworld.com/11/03/11-03-0714-00-000n-backwards-compatibility.ppt>), a short preamble sequence used for time synchronization, frequency synchronization, and automatic gain control (AGC), a long preamble containing a symbol for estimating a channel response, and a signal field are first transmitted from one transmitting antenna, and then long preambles for estimating channel responses are transmitted in turn from other transmitting antennas. After the transmission of the preamble is completed, data is simultaneously transmitted from a plurality of transmitting antennas. That is, long preambles for channel responses are transmitted from a plurality of transmitting antennas by time-division multiplexing.

In the MIMO system, the receiver must estimate the number of transmitting antennas in order to demodulate a transmission sequence. If this estimation of the number of transmitting antennas fails, the subsequent data field cannot be demodulated any longer. Therefore, the estimation requires very high accuracy. As a method by which the receiver estimates the number of transmitting antennas, it is possible to transmit a signal notifying the number of transmitting antennas from the transmitter. In this method, however, the overhead increases, and this unavoidably lowers the throughput of data transmission. It is also possible to estimate the number of transmitting antennas by using a received preamble signal. Since the preamble signal of the above reference is not for estimating the number of transmitting antennas, it is difficult to estimate the number of transmitting antennas by using this preamble.

In the MIMO system as described above, if the estimation of the number of transmitting antennas fails, the subsequent data portion cannot be demodulated any longer, so the estimation requires very high accuracy. On the other hand, the method by which the transmitter transmits a signal which notifies the number of transmitting antennas has the problem that the overhead inevitably increases. Also, in the technique described in the above reference, it is difficult to estimate the number of transmitting antennas by using the preamble signal.

It is, therefore, an object of the present invention to provide a wireless communication apparatus by which the receiving side can easily estimate the number of transmitting antennas used in transmission without any addition of a signal for notifying the number of transmitting antennas on the transmitter, and as a consequence a data symbol can be correctly demodulated.

BRIEF SUMMARY OF THE INVENTION

According to embodiments of the present invention, a wireless communication apparatus comprises a plurality of antennas; transmits a plurality of known symbol sequences each including a plurality of known symbols by using the antennas, each of the known symbols having subcarrier arrangement on which plural known information of the each of the known symbols are carried on, and inversion/non-inversion of a phase of known information on one of two adjacent subcarriers of the subcarrier arrangement being controlled in accordance with the number of the known symbols and time position of the each of the known symbols; and transmits data symbols by using the antennas after the known symbol sequences are transmitted.

According to embodiments of the present invention, a wireless communication apparatus receives a plurality of known symbol sequences and subsequent data symbols transmitted by a plurality of antennas, each of the known symbol sequence including a plurality of known symbols, each of the known symbols having subcarrier arrangement on which plural known information of the each of the known symbols are carried on, and inversion/non-inversion of a phase of known information on one of two adjacent subcarriers of the subcarrier arrangement being controlled in accordance with the number of the known symbols and time position of the each of the known symbols; calculates each channel estimation value corresponding to each of the subcarriers, from each known symbol received; calculates a correlation value between two channel estimation values corresponding to the two adjacent subcarriers, to obtain each correlation value corresponding to the each known symbol received; estimates the number of antennas based on the each correlation value and the number of known symbols received; and; processes the data symbols received by using the each channel estimation value and the number of antennas estimated.

BRIEF DESCRIPTION OF THE SEVERAL VIEWS OF THE DRAWING

FIG. 1 is a block diagram showing the arrangement of a transmitter according to the first to fourth embodiments of the present invention;

FIG. 5 is a block diagram showing the arrangement of a receiver according to the first to third embodiments;

FIG. 16 is a block diagram showing the arrangement of a receiver according to the fourth embodiment;

FIG. 17 is a view showing an example of a table showing the patterns (known symbol patterns) of known symbols transmitted from individual transmitting antennas.

DETAILED DESCRIPTION OF THE INVENTION

Figure 2:
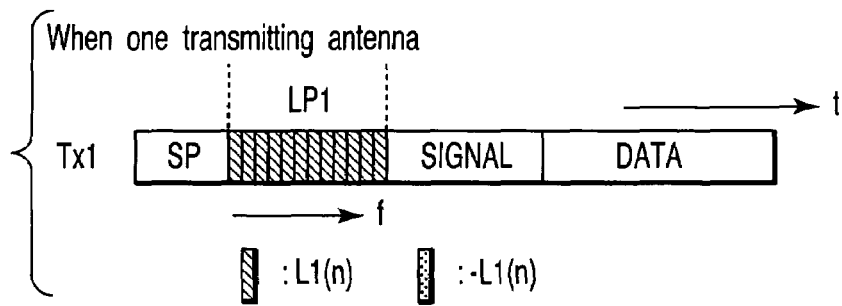
FIGS. 2 to 4 are views for explaining a known symbol transmission method according to the first embodiment.

Embodiments of the present invention will be described below with reference to the accompanying drawing. A wireless communication system according to each embodiment is applicable to, e.g., a wireless LAN or mobile communication system (cellular system) which includes at least one base station apparatus and at least one terminal apparatus. A transmitter and receiver included in a wireless communication apparatus such as the base station apparatus or terminal apparatus will be explained below.

First Embodiment

First, a transmitter according to the first embodiment will be described below with reference to FIG. 1. FIG. 1 shows physical layers of this transmitter. Data (a bit string) 10 to be transmitted is input in certain transmission units (e.g., frames or packets) from an upper layer. An encoder 11 performs, e.g., error correction coding on the input data 10, and generates a coded bit sequence. A serial-to-parallel (S/P) converter 12 divides the coded bit sequence into a plurality of streams by serial-to-parallel conversion. Modulators 13-1 to 13-M map these streams on a complex plane to generate modulated data symbols.

Serial-to-parallel (S/P) converters 14-1 to 14-M perform serial-to-parallel conversion on the modulated data symbols so that they are transmitted on subcarriers of orthogonal frequency-division multiplexing (OFDM). In addition, inverse fast Fourier transform (IFFT) units 18-1 to 18-M transform these signals on the frequency domain into waveforms in the time domain. The waveform in the time domain output from the IFFT units 18-1 to 18-M are input to a transmitting unit 19.

In the transmitting unit 19, a guard interval (GI) is added to the signals output from the IFFT units 18-1 to 18-M, and the obtained signals are converted into analog signals by a D/A converter. The signals output from the D/A converter are converted (up-converted) into an RF (Radio-Frequency) band by a frequency converter, and supplied to transmitting antennas 20-1 to 20-M via a power amplifier. The OFDM signals are transmitted from the transmitting antennas 20-1 to 20-M to a wireless communication apparatus of a communication partner.

Preambles are transmitted before the data symbols are thus transmitted as the OFDM signals. A transmission system of known symbols, which are used for estimating channel will be explained below.

A known symbol pattern generator 15 is, e.g., a ROM, and stores a plurality of known symbol patterns. Each known symbol is transmitted by carrying its information on some of a plurality of OFDM subcarriers. A known symbol pattern indicates a subcarrier on which information of a known symbol is to be carried. In the example shown in FIG. 1, the ROM stores known symbol patterns on the frequency domain.

In the case that a known symbol is to be transmitted, a plurality of known symbol patterns stored in the ROM of the known symbol pattern generator 15 are sequentially read out at the transmission timing of the known symbol in accordance with a signal from a counter 16. The counter 16 counts the time, and outputs the count value which momentarily changes.

When known symbol patterns on the frequency domain are stored in the ROM of the known symbol pattern generator 15 as in this example, the readout known symbol patterns are input to the IFFT units 18-1 to 18-M via a selector 17, converted into waveforms in the time domain, and supplied to the transmitting unit 19.

If waveforms in the time domain of known patterns are stored in the ROM, readout known symbols are supplied to the transmitting unit 19 by bypassing the IFFT units 18-1 to 18-M.

A plurality of known symbols are continuously transmitted from each antenna. The selector 17 distributes known symbol patterns read out from the ROM of the known symbol pattern generator 15, in accordance with the transmission timings of the known symbols which are continuously transmitted, such that the readout known symbol patterns are transmitted from appropriate transmitting antennas. That is, the selector 17 distributes the known symbol patterns to the transmitting antennas 20-1 to 20-M in accordance with the count value indicating time information from the counter 16. Note that if a plurality of types of known symbols such as a short preamble and long preamble included in preambles of a wireless LAN are present, the counter 16 and selector 17 selectively read out these different types of known symbol patterns from the ROM.

The selector 17 prestores a table as shown in FIG. 17 which shows patterns (known symbol patterns) of known symbols transmitted from the individual transmitting antennas. On the basis of this table, the selector 17 distributes the known symbol patterns read out from the known symbol pattern generator 15, such that these patterns are transmitted from appropriate transmitting antennas. Note that for the sake of simplicity, the transmitting antennas 20-1 to 20-M shown in FIG. 1 are represented by antennas 1 to M in FIG. 17.

Referring to FIG. 17, for symbol 1 as one of known symbols transmitted from antenna 1, antenna 2, . . . , antenna M-1, and antenna M, pattern 1, pattern 2, . . . , pattern M1, and pattern M are transmitted from these antennas. For symbol 2, pattern 2, pattern 3, . . . , pattern M, and pattern 1, which are shifted by one pattern from the known symbol patterns transmitted from symbol 1, are transmitted as known symbol patterns from the antennas. Likewise, for symbol M-1, pattern M1, pattern M, . . . , pattern M-2 are transmitted as known symbol patterns from the antennas. For symbol M transmitted last, pattern M', pattern 1', . . . , pattern M-1' are transmitted from the antennas. A pattern k'(k=1, . . . , M) carries its information on the same subcarrier as carrying information of a known symbol for a pattern k, and uses a value different from the pattern k as the information.

On the other hand, when receiving the M known symbols simultaneously transmitted from the individual transmitting antennas, a receiver (to be described later) can obtain channel estimation values for all subcarriers and can also estimate the number of transmitting antennas.

Figure 3:
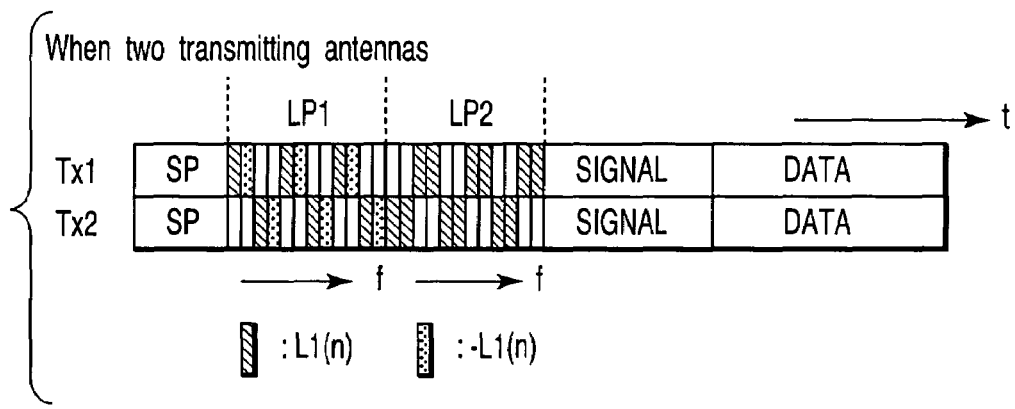
Figure 4:
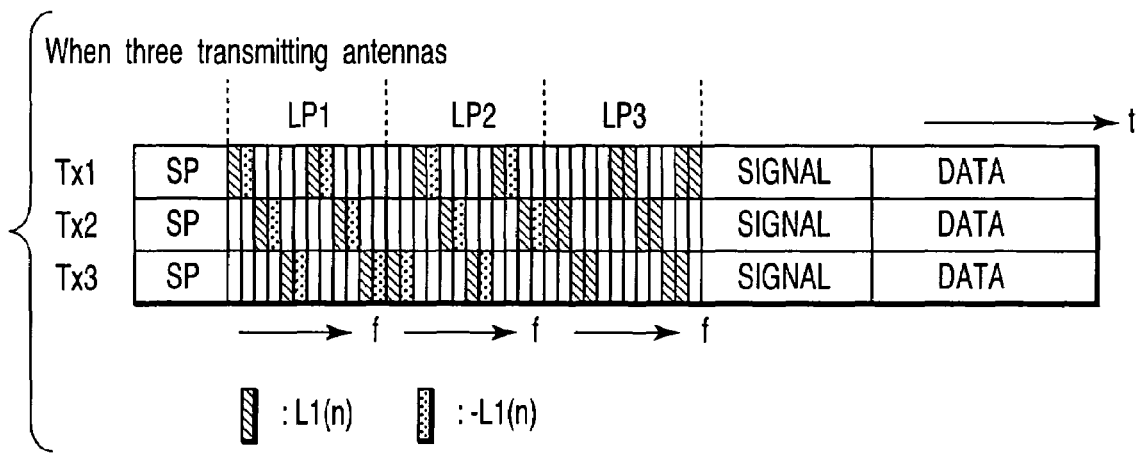

An example of a method of transmitting known symbols for channel estimation will be explained in detail below with reference to FIGS. 2 to 4. FIGS. 2 to 4 illustrate the structures of radio frames containing preambles when there are, respectively, one, two, and three transmitting antennas which simultaneously transmit known symbols. The first embodiment assumes a system such as a wireless LAN which transmits a short preamble SP for synchronization and a long preamble LP for channel estimation before a data field (DATA). The arrangement of the short preamble SP is not particularly limited. For example, a short preamble similar to the IEEE 802.11a can be transmitted from a plurality of transmitting antennas.

A known symbol is used to estimate a channel response in MIMO communication. In a wireless LAN, a known symbol corresponds to the long preamble LP shown in FIGS. 2 to 4. Referring to FIGS. 2 to 4, frequency-division multiplexing is performed on the long preamble LP transmitted from each transmitting antenna. Letting M be the number of transmitting antennas and N be the number of OFDM subcarriers, assume that N can be divided by 2M without a remainder. In this case, information of a known symbol exists in subcarriers represented by expressions (1) and (2) below (the numbers of the N subcarriers are defined as 0th to (N-1)th), and does not exit in any other subcarrier.

$$2(Mk+m+i-2) \bmod N \quad (1)$$

$$\{2(Mk+m+i-2)+1\} \bmod N \quad (2)$$

where $m=1, 2, \ldots, M$ are the antenna numbers, $i=1, 2, 3, \ldots$, are the numbers of known symbols in the time direction, and $k=0, 1, \ldots, (N/2M-1)$.

In addition, as shown in FIG. 2, letting $L_1(n)$ be an information value of a known symbol carried on the nth subcarrier when there is one antenna, an information value $L_M(n)$ of the ith known symbol carried on the nth subcarrier of the mth antenna when there are $M(\geq 2)$ antennas is given by if $i=M$ or n is an even number $$L_M(n)=L_1(n) \quad (3)$$

if $i \neq M$ and n is an odd number $$L_M(n)=-L_1(n) \quad (4)$$

For example, in the case of FIG. 2 (M=1: one antenna), the combinations of the numbers of subcarriers, in which information of one known symbol transmitted from antenna 1 exists, and information values carried on these subcarriers are as follows.

Antenna 1: first known symbol: in {0th, 1st, 2nd, 3rd, 4th, 5th, 6th, 7th, 8th, 9th, 10th, and 11th} subcarriers, information values are {$L_1(0)$, $L_1(1)$, $L_1(2)$, $L_1(3)$, $L_1(4)$, $L_1(5)$, $L_1(6)$, $L_1(7)$, $L_1(8)$, $L_1(9)$, $L_1(10)$, and $L_1(11)$}

In the case of FIG. 3 (M=2: two antennas), the combinations of the numbers of subcarriers, in which information of two known symbols transmitted from antennas 1 and 2 exists, and information values carried on these subcarriers are as follows on the basis of expressions (1), (2), (3), and (4).

Antenna 1: first known symbol: in {0th, 1st, 4th, 5th, 8th, and 9th} subcarriers, information values are {$L_1(0)$, $-L_1(1)$, $L_1(4)$, $-L_1(5)$, $L_1(8)$, and $-L_1(9)$}

Antenna 1: second known symbol: in {2nd, 3rd, 6th, 7th, 10th, and 11th} subcarriers, information values are {$L_1(2)$, $L_1(3)$, $L_1(6)$, $L_1(7)$, $L_1(10)$, and $L_1(11)$}

Antenna 2: first known symbol: in {2nd, 3rd, 6th, 7th, 10th, and 11th} subcarriers, information values are {$L_1(2)$, $-L_1(3)$, $L_1(6)$, $-L_1(7)$, $L_1(10)$, and $-L_1(11)$}

Antenna 2: second known symbol: in {0th, 1st, 4th, 5th, 8th, and 9th} subcarriers, information values are {$L_1(0)$, $L_1(1)$, $L_1(4)$, $L_1(5)$, $L_1(8)$, and $L_1(9)$}

In the case of FIG. 4 (M=3: three antennas), the combinations of the numbers of subcarriers, in which information of three known symbols transmitted from antennas 1, 2, and 3 exists, and information values carried on these subcarriers are as follows on the basis of expressions (1), (2), (3), and (4).

Antenna 1: first known symbol: in {0th, 1st, 6th, and 7th} subcarriers, information values are {$L_1(0)$, $-L_1(1)$, $L_1(6)$, and $-L_1(7)$}

Antenna 1: second known symbol: in {2nd, 3rd, 8th, and 9th} subcarriers, information values are {$L_1(2)$, $-L_1(3)$, $L_1(8)$, and $-L_1(9)$}

Antenna 1: third known symbol: in {4th, 5th, 10th, and 11th} subcarriers, information values are {$L_1(4)$, $L_1(5)$, $L_1(10)$, and $L_1(11)$}

Antenna 2: first known symbol: in {2nd, 3rd, 8th, and 9th} subcarriers, information values are {$L_1(2)$, $-L_1(3)$, $L_1(8)$, and $-L_1(9)$}

Antenna 2: second known symbol: in {4th, 5th, 10th, and 11th} subcarriers, information values are {$L_1(4)$, $-L_1(5)$, $L_1(10)$, and $-L_1(11)$}

Antenna 2: third known symbol: in {0th, 1st, 6th, and 7th} subcarriers, information values are {$L_1(0)$, $L_1(1)$, $L_1(6)$, and $L_1(7)$}

Antenna 3: first known symbol: in {4th, 5th, 10th, and 11th} subcarriers, information values are {$L_1(4)$, $-L_1(5)$, $L_1(10)$, and $-L_1(11)$}

Antenna 3: second known symbol: in {0th, 1st, 6th, and 7th} subcarriers, information values are {$L_1(0)$, $-L_1(1)$, $L_1(6)$, and $-L_1(7)$}

Antenna 3: third known symbol: in {2nd, 3rd, 8th, and 9th} subcarriers, information values are {$L_1(2)$, $L_1(3)$, $L_1(8)$, and $L_1(9)$}

Note that in FIGS. 2 to 4, the preamble structure is represented in time domain. However, for the sake of convenience, subcarriers in which information of the long preamble LP exists are represented by oblique lines and dots. Also, subcarriers indicated by dots in FIGS. 2 to 4 represent subcarriers into which information whose phase is inverted by expression (4) is inserted. Furthermore, even when there are four or more antennas, the numbers of subcarriers where information exists in known symbols transmitted from the individual antennas and the information values are obvious from the above analogy.

As shown in FIGS. 2 to 4, the known symbol according to the first embodiment uses two adjacent subcarriers, and different subcarriers are used for different antennas. Also, in the known symbol transmitted last, the same information as the known symbol when there is one antenna as shown in FIG. 2 is carried on each subcarrier. In a known symbol transmitted before the last known symbol, the same information as the known symbol when there is one antenna is carried on even-numbered subcarriers, and phase-inverted information of the known symbol when there is one antenna is carried on odd-numbered subcarriers.

The receiver according to the first embodiment of the present invention will be described below with reference to FIG. 5. Referring to FIG. 5, the OFDM signals of the RF band transmitted from the transmitter shown in FIG. 1 are received by a plurality of receiving antennas 30-1 to 30-M. OFDM received signals from the receiving antennas 30-1 to 30-M are input to a receiving unit 31.

In the receiving unit 31, the input OFDM signals from the receiving antennas 30-1 to 30-M are amplified by a low-noise amplifier (LNA), and converted (down-converted) into a base band by a frequency converter. In addition, these frequency-converted signals are converted into digital signals by an analog-to digital (A/D) converter, and the guard interval (GI) is removed from the digital signals.

The output signals from the receiving unit 31 are input to fast Fourier transform (FFT) units 32-1 to 32-M where these waveform signals in the time domain are transformed into waveform signals in the frequency domain, i.e., into the waveforms of individual subcarriers. Of the output signals from the FFT units 32-1 to 32-M, signals of data symbol sections are input to an MIMO signal processing unit 39.

On the other hand, of the output signals from the FFT units 32-1 to 32-M, signals of preambles, particularly, known symbol sections are input to dividing units 33-1 to 33-M. The waveforms of the individual subcarriers input to these dividing units are divided by a known symbol pattern stored in a ROM 34, and thereby converted into estimation values of the channel characteristics. These estimation values are stored in memories 38-1 to 38-M and input to correlators 35-1 to 35-M. The known information pattern stored in the ROM 34 is the same as in the case of FIG. 2 (the number M of antennas is one).

The correlators 35-1 to 35-M calculate a correlation value by using the channel characteristic estimation values, and input the correlation value to a determination unit 36. If the determination unit 36 determines that the input correlation value is negative, a counter 37 is incremented, and the next known symbol is received. If the determination unit 36 determines that the input correlation value is positive, the current counter value is output as an estimation value of the number of transmitting antennas to the MIMO signal processing unit 39. Details of the above transmitting antenna count estimating algorithm will be explained later.

The MIMO signal processing unit 39 performs an MIMO signal receiving process, e.g., maximum likelihood estimation, on the data symbol section signals from the FFT units 32-1 to 32-M in accordance with the channel estimation values from the memories 38-1 to 38-M, and the estimation value of the number of transmitting antennas from the counter 37. Channel decoding is performed on the signals having undergone this MIMO signal receiving process, thereby reconstructing transmitted data 40.

Assume that the nth subcarrier signal of the ith known symbol received by the jth receiving antenna is Xj(i,n). An estimation value (an output signal from a dividing unit) Aj(i,n) of the channel characteristic of this subcarrier is given by $$Aj(i,n)=Xj(i,n)/L1(n) \quad (5)$$

Letting hj(i,n) be the actual channel characteristic value of this subcarrier, and Nj(i,n) be the noise signal, Xj(i,n) can be expressed by $$Xj(i,n)=hj(i,n) \cdot L_M(n)+Nj(i,n)$$

Therefore, equation (5) can be expressed by $$Aj(i,n)=hj(i,n) \cdot L_M(n)/L1(n)+Nj(i,n)/L1(n) \quad (6)$$

To simplify the explanation, assume an ideal environment ($N_j(i,n)=0$) to which no noise is added. In this case, equation (6) can be simply expressed by $$Aj(i,n)=hj(i,n) \cdot L_M(n)/L1(n) \quad (7)$$

Assume that the effects of channels between adjacent subcarriers transmitted from the same antenna are substantially the same. That is, assuming that the channel characteristic of adjacent subcarriers transmitted from the same antenna have a high positive correlation value, it is expected that the following channel characteristic $A_j(i,n)$ is obtained from all the receiving antennas.

<One Transmitting Antenna>

Since $L_M(n)=L_1(n)$, $A_j(i,n)=h_j(i,n)$ holds from equation (7). Also, since all subcarriers are transmitted from the same antenna, an estimation value $A_j(i,n)$ of the channel characteristic of an even-numbered subcarrier and an estimation value $A_j(i,n+1)$ of the channel characteristic of an adjacent subcarrier having the next number have a high positive correlation.

<Two Transmitting Antennas>

For even-numbered subcarriers of the first received known symbol, $L_M(n)=L_1(n)$ holds from equation (3), so Aj(i,n)=hj (i,n) holds from equation (7). On the other hand, for odd-numbered subcarriers, $L_M(n)=-L_1(n)$ holds from equation (3), so $A_j(i,n)=-h_j(i,n)$ holds from equation (7), i.e., the phase of this characteristic is inverted from that of the actual channel characteristic. Since an even-numbered subcarrier and an adjacent subcarrier having the next number are transmitted from the same antenna, an estimation value $A_j(i,n)$ of the channel characteristic of the even-numbered subcarrier and an estimation value $A_j(i,n+1)$ of the channel characteristic of the subcarrier having the next number have a high correlation. However, $A_j(i,n+1)$ corresponds to an odd-numbered subcarrier, and its characteristic has a phase inverted from that of the actual channel. Therefore, the estimation values of these subcarriers have a high negative correlation.

In the second received known symbol, $L_M(n)=L_1(n)$ holds from equation (3), so $A_j(i,n)=h_j(i,n)$ holds from equation (7). Since an even-numbered subcarrier and an adjacent subcarrier having the next number are transmitted from the same antenna, an estimation value $A_j(i,n)$ of the channel characteristic of the even-numbered subcarrier and an estimation value $A_j(i,n+1)$ of the channel characteristic of the subcarrier having the next number have a high positive correlation.

<Three Transmitting Antennas>

For even-numbered subcarriers of the first received known symbol, $L_M(n)=L_1(n)$ holds from equation (3), so $A_j(i,n)=h_j(i,n)$ holds from equation (7). On the other hand, for odd-numbered subcarriers, $L_M(n)=-L_1(n)$ holds from equation (3), so $A_j(i,n)=-h_j(i,n)$ holds from equation (7), i.e., the phase of this characteristic is inverted from that of the actual channel characteristic. Since an even-numbered subcarrier and an adjacent subcarrier having the next number are transmitted from the same antenna, an estimation value $A_j(i,n)$ of the channel characteristic of the even-numbered subcarrier and an estimation value $A_j(i,n+1)$ of the channel characteristic of the subcarrier having the next number have a high correlation. However, $A_j(i,n+1)$ corresponds to an odd-numbered subcarrier, and its characteristic has a phase inverted from that of the actual channel. Therefore, the estimation values of these subcarriers have a high negative correlation.

For even-numbered subcarriers of the second received known symbol, $L_M(n)=L_1(n)$ holds from equation (3), so $A_j(i,n)=h_j(i,n)$ holds from equation (7). On the other hand, for odd-numbered subcarriers, $L_M(n)=-L_1(n)$ holds from equation (3), so $A_j(i,n)=-h_j(i,n)$ holds from equation (7), i.e., the phase of this characteristic is inverted. Since an even-numbered subcarrier and an adjacent subcarrier having the next number are transmitted from the same antenna, an estimation value $A_j(i,n)$ of the channel characteristic of the even-numbered subcarrier and an estimation value $A_j(i,n+1)$ of the channel characteristic of the subcarrier having the next number have a high correlation. However, $A_j(i,n+1)$ corresponds to an odd-numbered subcarrier, and its characteristic has a phase inverted from that of the actual channel. Therefore, the estimation values of these subcarriers have a high negative correlation.

In the third received known symbol, $L_M(n)=L_1(n)$ holds from equation (3), so $A_j(i,n)=h_j(i,n)$ holds from equation (7). Since an even-numbered subcarrier and an adjacent subcarrier having the next number are transmitted from the same antenna, an estimation value $A_j(i,n)$ of the channel characteristic of the even-numbered subcarrier and an estimation value $A_j(i,n+1)$ of the channel characteristic of the subcarrier having the next number have a high positive correlation.

As is apparent from the above description, when there are M transmitting antennas, the channel characteristic of an even-numbered subcarrier, which is estimated from the Mth received symbol, and the channel characteristic of an adjacent subcarrier having the next number have a high positive correlation value. Accordingly, it can be estimated at this point there are M antennas.

The algorithm of estimating the number of transmitting antenna in the receiver shown in FIG. 5 will be described below with reference to FIG. 6. First, "1" is set as an initial value in the counter 37 (step S1), and the waveform in the frequency domain of a known symbol received by the jth antenna is input to a dividing unit 30-j (steps S2 and S3). The waveform of each subcarrier input to the dividing unit 30-j is divided by the known symbol pattern stored in the ROM 34, and thereby converted into a channel characteristic. The channel characteristic is stored in a memory 38-j, and input to a correlator 35-j (step S4).

Then, the correlator 35-j obtains a correlation value of the estimation values of the channel characteristics of an even-numbered subcarrier and odd-numbered subcarrier. When the ith known symbol is received, this correlation calculation is defined as follows.

(Correlation value)=$A_j(i,0)*A_j(i,1)+A_j(i,2)*A_j(i,3)+A_j(i,4)*A_j(i,5)+ \ldots +A_j(i,N-2)*A_j(i,N-1)$ where a*b is a calculation of multiplying a by the complex conjugate of b.

If the correlation value calculated by the correlator 35-j is positive (step S5), the determination unit 36 determines that the currently received symbol is the last known symbol, and estimates the number of transmitting antennas on the basis of the number of known symbol patterns received up to this point and counted by the counter 37 (step S6). Since the number of known symbols is equal to the number of transmitting antennas, this counter value is an estimation value of the number of transmitting antennas. The MIMO signal processing unit 39 reconstructs the data symbols by using the number of transmitting antennas thus estimated.

On the other hand, if in step S5 the correlation value is not positive, the counter 35 is incremented (step S7), and the channel characteristic, which is calculated by the dividing unit 30-j and stored in the memory 38-j, and which corresponds to the odd-numbered subcarrier, is multiplied by −1. The product is stored in the memory 38-j again, and the next known symbol is received (step S8). The operations in steps S3 to S8 are repeated whenever a new known symbol is received.

If a plurality of receiving antennas are used, the following methods are also possible.

(a) Only when correlation values are positive for all the receiving antennas, it is determined that the end of a known symbol is detected, and the number of transmitting antennas is determined.

(b) Correlation values calculated from all the receiving antennas are added, and, if the total correlation value is positive, it is determined that the end of a known symbol is detected, and the number of transmitting antennas is determined.

Although in method (a) the conditions are severer, the number of transmitting antennas can be reliably detected if the conditions are met.

In the first embodiment as described above, the number of transmitting antennas can be estimated, without any notification of the number of transmitting antennas from the transmitting side, while channel estimation of each antenna is performed by using a known symbol.

Second Embodiment

Figure 7:
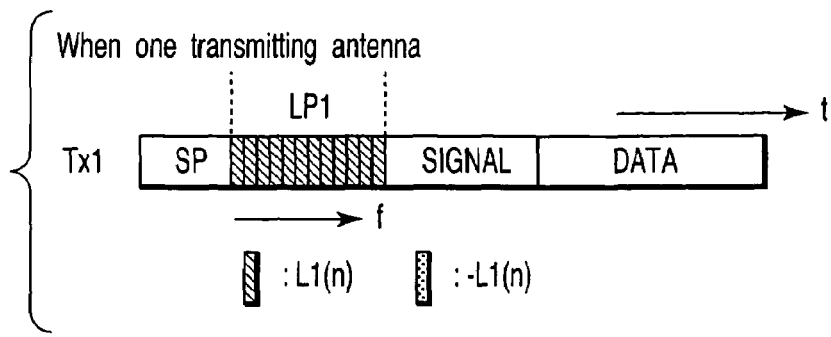
FIGS. 7 to 9 are views for explaining a known symbol transmission method according to the second embodiment.
Figure 8:
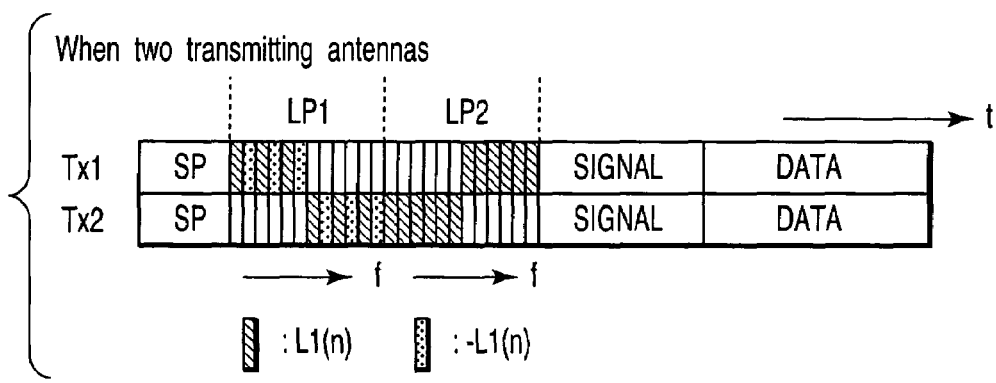
Figure 9:
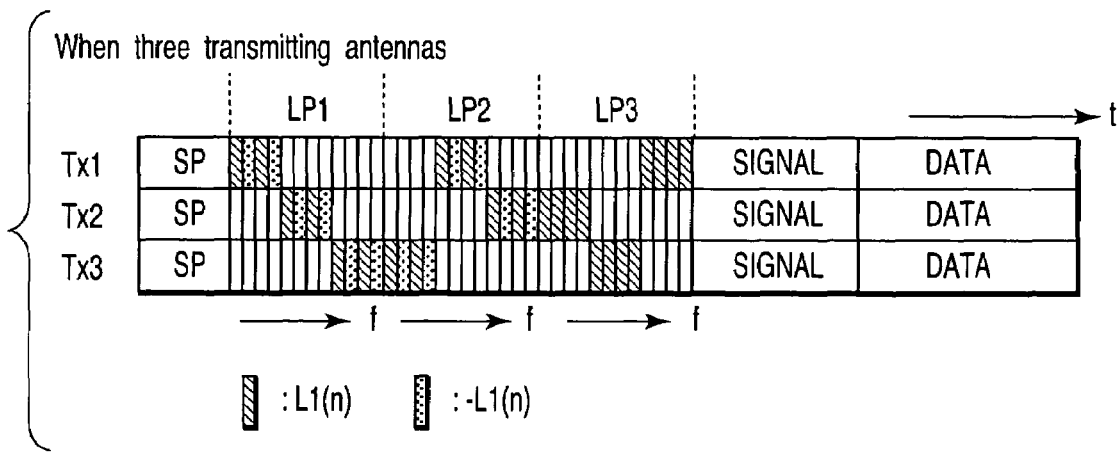

A method of transmitting known symbols for channel estimation according to the second embodiment will be described below with reference to FIGS. 7 to 9. FIGS. 7 to 9 illustrate the structures of radio frames containing preambles when there are, respectively, one, two, and three transmitting antennas which simultaneously transmit known symbols.

In the case of FIG. 7 (M=1: one antenna), the combinations of the numbers of subcarriers, in which information of one known symbol transmitted from antenna 1 exists, and information values carried on these subcarriers are as follows.

Antenna 1: first known symbol: in {0th, 1st, 2nd, 3rd, 4th, 5th, 6th, 7th, 8th, 9th, 10th, and 11th} subcarriers, information values are $\{L_1(0), L_1(1), L_1(2), L_1(3), L_1(4), L_1(5), L_1(6), L_1(7), L_1(8), L_1(9), L_1(10),$ and $L_1(11)\}$ In the case of FIG. 8 (M=2: two antennas), the combinations of the numbers of subcarriers, in which information of two known symbols transmitted from antennas 1 and 2 exists, and information values carried on these subcarriers are as follows.

Antenna 1: first known symbol: in {0th, 1st, 2nd, 3rd, 4th, and 5th)} subcarriers, information values are $\{L_1(0), -L_1(1), L_1(2), -L_1(3), L_1(4),$ and $-L_1(5)\}$ Antenna 1: second known symbol: in {6th, 7th, 8th, 9th, 10th, and 11th} subcarriers, information values are $\{L_1(6), L_1(7), L_1(8), L_1(9), L_1(10),$ and $L_1(11)\}$ Antenna 2: first known symbol: in {6th, 7th, 8th, 9th, 10th, and 11th)} subcarriers, information values are $\{L_1(6), -L_1(7), L_1(8), -L_1(9), L_1(10),$ and $-L_1(11)\}$ Antenna 2: second known symbol: in {0th, 1st, 2nd, 3rd, 4th, and 5th} subcarriers, information values are $\{L_1(0), L_1(1), L_1(2), L_1(3), L_1(4),$ and $L_1(5)\}$ In the case of FIG. 9 (M=three: three antenna), the combinations of the numbers of subcarriers, in which information of three known symbols transmitted from antennas 1, 2, and 3 exists, and information values carried on these subcarriers are as follows.

Antenna 1: first known symbol: in {0th, 1st, 2nd, and 3rd)} subcarriers, information values are $\{L_1(0), -L_1(1), L_1(2),$ and $-L_1(3)\}$ Antenna 1: second known symbol: in {4th, 5th, 6th, and 7th)} subcarriers, information values are $\{L_1(4), -L_1(5), L_1(6),$ and $-L_1(7)\}$ Antenna 1: third known symbol: in {8th, 9th, 10th, and 11th)} subcarriers, information values are $\{L_1(8), L_1(9), L_1(10),$ and $L_1(11)\}$ Antenna 2: first known symbol: in {4th, 5th, 6th, and 7th)} subcarriers, information values are $\{L_1(4), -L_1(5), L_1(6),$ and $-L_1(7)\}$ Antenna 2: second known symbol: in {8th, 9th, 10th, and 11th} subcarriers, information values are $\{L_1(8), -L_1(9), L_1(10),$ and $-L_1(11)\}$ Antenna 2: third known symbol: in {0th, 1st, 2nd, and 3rd)} subcarriers, information values are $\{L_1(0), L_1(1), L_1(2),$ and $L_1(3)\}$ Antenna 3: first known symbol: in {8th, 9th, 10th, and 11th} subcarriers, information values are {$L_1(8)$, $-L_1(9)$, $L_1(10)$, and $-L_1(11)$}

Antenna 3: second known symbol: in {0th, 1st, 2nd, and 3rd} subcarriers, information values are {$L_1(0)$, $-L_1(1)$, $L_1(2)$, and $-L_1(3)$}

Antenna 3: third known symbol: in {4th, 5th, 6th, and 7th)} subcarriers, information values are {$L_1(4)$, $L_1(5)$, $L_1(6)$, and $L_1(7)$}

As shown in FIGS. 7 to 9, similar to the known symbol of the first embodiment, the known symbol according to the second embodiment uses two adjacent subcarriers, and different subcarriers are used for different antennas. Also, in the known symbol transmitted last, the same information as the known symbol when there is one antenna as shown in FIG. 7 is carried on each subcarrier. In each known symbol transmitted before the last known symbol, the same information as the known symbol when there is one antennas is carried on even-numbered subcarriers, and phase-inverted information of the known symbol when there is one antenna is carried on odd-numbered subcarriers. Therefore, as in the first embodiment, the number of transmitting antennas can be estimated by using the receiver shown in FIG. 5.

Third Embodiment

Figure 10:
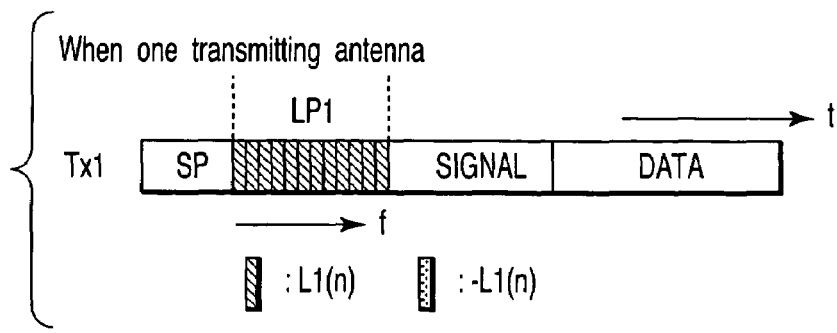
FIGS. 10 to 12 are views for explaining a known symbol transmission method according to the third embodiment.
Figure 11:
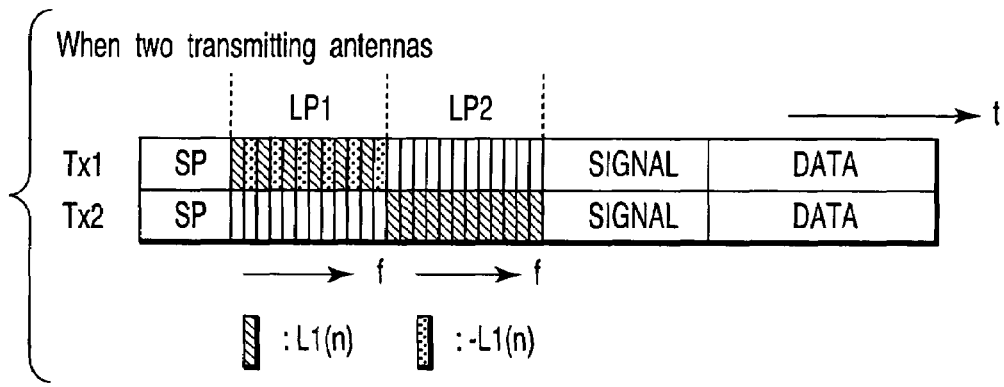
Figure 12:
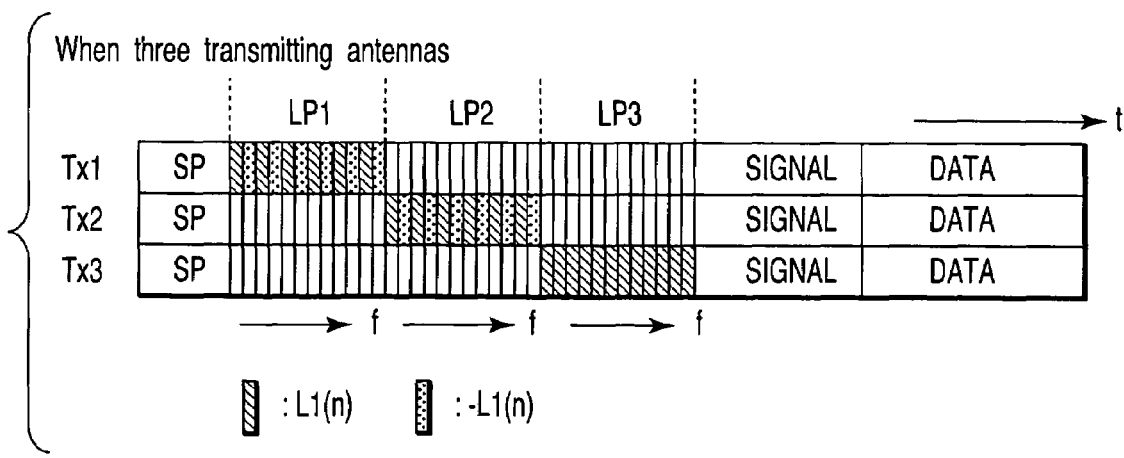

A method of transmitting known symbols for channel estimation according to the third embodiment will be described below with reference to FIGS. 10 to 12. FIGS. 10 to 12 illustrate the structures of radio frames containing preambles when there are, respectively, one, two, and three transmitting antennas which simultaneously transmit known symbols.

In the case of FIG. 10 (M=1: one antenna), the combinations of the numbers of subcarriers, in which information of one known symbol transmitted from antenna 1 exists, and information values carried on these subcarriers are as follows.

Antenna 1: first known symbol: in {0th, 1st, 2nd, 3rd, 4th, 5th, 6th, 7th, 8th, 9th, 10th, and 11th} subcarriers, information values are {$L_1(0)$, $L_1(1)$, $L_1(2)$, $L_1(3)$, $L_1(4)$, $L_1(5)$, $L_1(6)$, $L_1(7)$, $L_1(8)$, $L_1(9)$, $L_1(10)$, and $L_1(11)$}

In the case of FIG. 11 (M=2: two antennas), the combinations of the numbers of subcarriers, in which information of two known symbols transmitted from antennas 1 and 2 exists, and information values carried on these subcarriers are as follows.

Antenna 1: first known symbol: in {0th, 1st, 2nd, 3rd, 4th, 5th, 6th, 7th, 8th, 9th, 10th, and 11th} subcarriers, information values are {$L_1(0)$, $-L_1(1)$, $L_1(2)$, $-L_1(3)$, $L_1(4)$, $-L_1(5)$, $L_1(6)$, $-L_1(7)$, $L_1(8)$, $-L_1(9)$, $L_1(10)$, and $-L_1(11)$}

Antenna 2: second known symbol: in {0th, 1st, 2nd, 3rd, 4th, 5th, 6th, 7th, 8th, 9th, 10th, and 11th} subcarriers, information values are {$L_1(0)$, $L_1(1)$, $L_1(2)$, $L_1(3)$, $L_1(4)$, $L_1(5)$, $L_1(6)$, $L_1(7)$, $L_1(8)$, $L_1(9)$, $L_1(10)$, and $L_1(11)$}

In the case of FIG. 12 (M=3: three antennas), the combinations of the numbers of subcarriers, in which information of three known symbols transmitted from antennas 1, 2, and 3 exists, and information values carried on these subcarriers are as follows.

Antenna 1: first known symbol: in {0th, 1st, 2nd, 3rd, 4th, 5th, 6th, 7th, 8th, 9th, 10th, and 11th)} subcarriers, information values are {$L_1(0)-L_1(1)$, $L_1(2)$, $-L_1(3)$, $L_1(4)$, $-L_1(5)$, $L_1(6)$, $-L_1(7)$, $L_1(8)$, $-L_1(9)$, $L_1(10)$, and $-L_1(11)$}

Antenna 2: second known symbol: in {0th, 1st, 2nd, 3rd, 4th, 5th, 6th, 7th, 8th, 9th, 10th, and 11th)} subcarriers, information values are {$L_1(0)$, $-L_1(1)$, $L_1(2)$, $-L_1(3)$, $L_1(4)$, $-L_1(5)$, $L_1(6)$, $-L_1(7)$, $L_1(8)$, $-L_1(9)$, $L_1(10)$, and $-L_1(11)$}

Antenna 3: third known symbol: in (0th, 1st, 2nd, 3rd, 4th, 5th, 6th, 7th, 8th, 9th, 10th, and 11th) subcarriers, information values are {$L_1(0)$, $L_1(1)$, $L_1(2)$, $L_1(3)$, $L_1(4)$, $L_1(5)$, $L_1(6)$, $L_1(7)$, $L_1(8)$, $L_1(9)$, $L_1(10)$, and $L_1(11)$}

As shown in FIGS. 10 to 12, similar to the known symbols of the first and second embodiments, the known symbol according to the third embodiment uses two adjacent subcarriers, and different subcarriers are used for different antennas. Also, in the known symbol transmitted last, the same information as the known symbol when there is one antenna as shown in FIG. 10 is carried on each subcarrier. In each known symbol transmitted before the last known symbol, the same information as the known symbol when there is one antenna is carried on even-numbered subcarriers, and phase-inverted information of the known symbol when there is one antenna is carried on odd-numbered subcarriers. Therefore, as in the first and second embodiments, the number of transmitting antennas can be estimated by using the receiver shown in FIG. 5.

Fourth Embodiment

Figure 13:
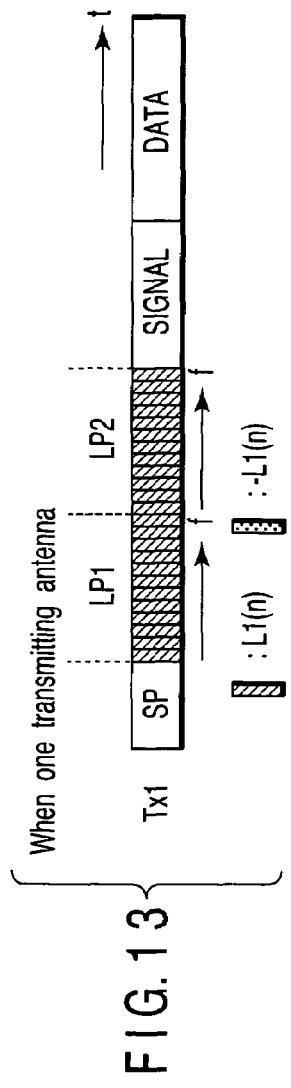
FIGS. 13 to 15 are views for explaining a known symbol transmission method according to the fourth embodiment.
Figure 14:
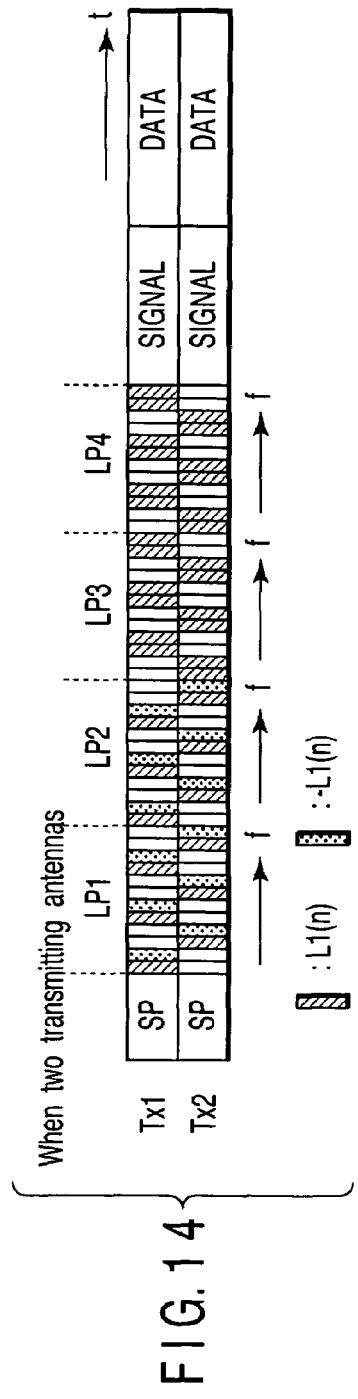
Figure 15:
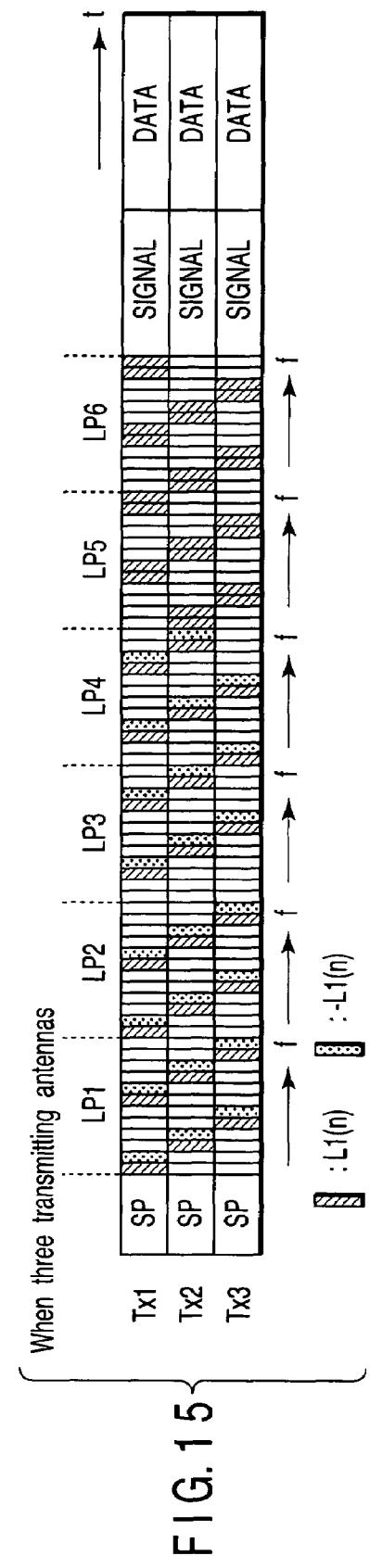

A method of transmitting known symbols for channel estimation according to the fourth embodiment will be described below with reference to FIGS. 13 to 15. FIGS. 13 to 15 illustrate the structures of radio frames containing preambles when there are, respectively, one, two, and three transmitting antennas which simultaneously transmit known symbols.

In the first to third embodiments, channels and the number of transmitting antennas can be estimated by receiving M known symbols from M transmitting antennas. In contrast, to raise the accuracy of channel estimation, FIGS. 13 to 15 assume the transmission of 2M known symbols.

In the case of FIG. 13 (M=1: one antenna), the combinations of the numbers of subcarriers, in which information of two known symbols transmitted from antenna 1 exists, and information values carried on these subcarriers are as follows.

Antenna 1: first and second known symbols: in {0th, 1st, 2nd, 3rd, 4th, 5th, 6th, 7th, 8th, 9th, 10th, and 11th} subcarriers, information values are {$L_1(0)$, $L_1(1)$, $L_1(2)$, $L_1(3)$, $L_1(4)$, $L_1(5)$, $L_1(6)$, $L_1(7)$, $L_1(8)$, $L_1(9)$, $L_1(10)$, and $L_1(11)$}

In the case of FIG. 14 (M=2: two antennas), the combinations of the numbers of subcarriers, in which information of four known symbols transmitted from antennas 1 and 2 exists, and information values carried on these subcarriers are as follows.

Antenna 1: first and second known symbols: in {0th, 1st, 4th, 5th, 8th, and 9th} subcarriers, information values are {$L_1(0)$, $-L_1(1)$, $L_1(4)$, $-L_1(5)$, $L_1(8)$, and $-L_1(9)$}

Antenna 1: third and fourth known symbols: in {2nd, 3rd, 6th, 7th, 10th, and 11th)} subcarriers, information values are {$L_1(2)$, $L_1(3)$, $L_1(6)$, $L_1(7)$, $L_1(10)$, and $L_1(11)$}

Antenna 2: first and second known symbols: in {2nd, 3rd, 6th, 7th, 10th, and 11th)} subcarriers, information values are {$L_1(2)$, $-L_1(3)$, $L_1(6)$, $-L_1(7)$, $L_1(10)$, and $-L_1(11)$}

Antenna 2: third and fourth known symbols: in {0th, 1st, 4th, 5th, 8th, and 9th} subcarriers, information values are {$L_1(0)$, $L_1(1)$, $L_1(4)$, $L_1(5)$, $L_1(8)$, and $L_1(9)$}

In the case of FIG. 15 (M=3: three antennas), the combinations of the numbers of subcarriers, in which information of six known symbols transmitted from antennas 1, 2, and 3 exists, and information values carried on these subcarriers are as follows.

Antenna 1: first and second known symbols: in {0th, 1st, 6th, and 7th)} subcarriers, information values are {$L_1(0)$, $-L_1(1)$, $L_1(6)$, and $-L_1(7)$}

Antenna 1: third and fourth known symbols: in {2nd, 3rd, 8th, and 9th} subcarriers, information values are {$L_1(2)$, $-L_1(3)$, $L_1(8)$, and $-L_1(9)$}

Antenna 1: fifth and sixth known symbols: in {4th, 5th, 10th, and 11th} subcarriers, information values are {$L_1(4)$, $L_1(5)$, $L_1(10)$, and $L_1(11)$}

Antenna 2: first and second known symbols: in {2nd, 3rd, 8th, and 9th)} subcarriers, information values are {$L_1(2)$, $-L_1(3)$, $L_1(8)$, and $-L_1(9)$}

Antenna 2: third and fourth known symbols: in {4th, 5th, 10th, and 11th} subcarriers, information values are {$L_1(4)$, $-L_1(5)$, $L_1(10)$, and $-L_1(11)$}

Antenna 2: fifth and sixth known symbols: in {0th, 1st, 6th, and 7th)} subcarriers, information values are {$L_1(0)$, $L_1(1)$, $L_1(6)$, and $L_1(7)$}

Antenna 3: first and second known symbols: in {4th, 5th, 10th, and 11th)} subcarriers, information values are {$L_1(4)$, $-L_1(5)$, $L_1(10)$, and $-L_1(11)$}

Antenna 3: third and fourth known symbols: in {0th, 1st, 6th, and 7th)} subcarriers, information values are {$L_1(0)$, $-L_1(1)$, $L_1(6)$, and $-L_1(7)$}

Antenna 3: fifth and sixth known symbols: in {2nd, 3rd, 8th, and 9th)} subcarriers, information values are {$L_1(2)$, $L_1(3)$, $L_1(8)$, and $L_1(9)$}

In the fourth embodiment as described above, identical known symbols are continuously transmitted, and this lowers the transmission efficiency because the number of known symbols increases. However, the receiving side can reduce the influence of noise by averaging known symbols having the same pattern as follows, and thereby can increase the accuracy of estimation of the number of transmitting antennas and channel estimation.

A receiver according to the fourth embodiment has an arrangement as shown in FIG. 16 in order to perform estimation as described above. In FIG. 16, the same reference numerals as in FIG. 5 denote the same parts. FIG. 16 differs from FIG. 5 in that buffers 41-1 to 41-M and averaging units 42-1 to 42-M are added to the arrangement of the receiver shown in FIG. 5.

Referring to FIG. 16, OFDM signals of an RF band transmitted from a transmitter are received by a plurality of receiving antennas 30-1 to 30-M. The OFDM received signals from the receiving antennas 30-1 to 30-M are input to a receiving unit 31.

In the receiving unit 31, the input OFDM signals from the receiving antennas 30-1 to 30-M are amplified by a low-noise amplifier (LNA), and converted (down-converted) into a base band. In addition, these frequency-converted signals are converted into digital signals by an analog-to-digital (A/D) converter, and a guard interval (GI) is removed.

Of these output signals having undergone GI removal, signals having a time section corresponding to odd-numbered received known symbols are stored in the buffers 41-1 to 41-M. The averaging units 42-1 to 42-M calculate the average of these known symbols and known symbols received in the next time section. The output signals are input to FFT units 32-1 to 32-M. The FFT units 32-1 to 32-M transform the waveform signals in the time domain into waveform signals in the frequency domain, i.e., the waveforms of individual subcarriers. Of the output signals from the FFT units 32-1 to 32-M, signals of data symbol sections are input to an MIMO signal processing unit 39.

On the other hand, of the output signals from the FFT units 32-1 to 32-M, signals of preambles, particularly, known symbol sections are input to dividing units 33-1 to 33-M. The waveforms of the individual subcarriers input to these dividing units are divided by a known symbol pattern stored in a ROM 34, and thereby converted into estimation values of the channel characteristics. These estimation values are stored in memories 38-1 to 38-M and input to correlators 35-1 to 35-M. The known symbol pattern stored in the ROM 34 is the same as the first known symbol pattern in the case of FIG. 13 (one antenna).

The correlators 35-1 to 35-M calculate a correlation value by using the channel characteristic estimation values, and input the correlation value to a determination unit 36. If the input correlation value is negative, the determination unit 36 increments a counter 37, and receives the next known symbol. If the input correlation value is positive, the determination unit 36 determines that the currently received symbol is the last known symbol, and outputs the current counter value of the counter 37 as an estimation value of the number of transmitting antennas to an MIMO signal processing unit 39.

The MIMO signal processing unit 39 performs an MIMO signal receiving process, e.g., maximum likelihood estimation, on the data symbol section signals from the FFT units 32-1 to 32-M in accordance with the channel estimation values from the memories 38-1 to 38-M, and the estimation value of the number of transmitting antennas from the counter 37. Channel decoding is performed on the signals having undergone this MIMO signal receiving process, thereby reconstructing transmitted data 40.

Fifth Embodiment

In the first to fourth embodiments described above, for each known symbol except for a known symbol to be transmitted last of a known symbol sequence transmitted from each antenna, the phase of known information to be transmitted on one of two adjacent subcarriers is inverted. The phase of known information of the known symbol to be transmitted last is not inverted, indicating that this known symbol is the end of the known symbol sequence.

That is, the correlation value of the known symbol at the end of the known symbol sequence is a positive value. The number of transmitting antennas is estimated on the basis of the number of known symbols having negative correlation values and received before the known symbol having a positive correlation value is received.

The following method, however, is also possible. That is, for a known symbol to be transmitted last of a known symbol sequence transmitted from each antenna, the phase of known information to be transmitted on one of two adjacent subcarriers is inverted. The phase of known information of each known symbol except for the known symbol to be transmitted last is not inverted. In this method, the correlation value of the known symbol at the end of the known symbol sequence is a negative value. The number of transmitting antennas is estimated on the basis of the number of known symbols having positive correlation values and received before the known symbol having a negative correlation value is received.

For example, in FIG. 3, information values {$L_1(0)$, $L_1(1)$, $L_1(4)$, $L_1(5)$, $L_1(8)$, and $L_1(9)$} are allocated to the {0th, 1st, 4th, 5th, 8th, and 9th} subcarriers of the first known symbol of antenna 1, information values {$L_1(2)$, $-L_1(3)$, $L_1(6)$, $-L_1(7)$, $L_1(10)$, and $-L_1(11)$} are allocated to the {2nd, 3rd, 6th, 7th, 10th, and 11th} subcarriers of the second known symbol of antenna 1. Also, information values {$L_1(2)$, $L_1(3)$, $L_1(6)$, $L_1(7)$, $L_1(10)$, and $L_1(11)$} are allocated to the {2nd, 3rd, 6th, 7th, 10th, and 11th)} subcarriers of the first known symbol of antenna 2, and information values {$L_1(0)$, $-L_1(1)$, $L_1(4)$, $-L_1(5)$, $L_1(8)$, and $-L_1(9)$} are allocated to the {0th, 1st, 4th, 5th, 8th, and 9th} subcarriers of the second known symbol of antenna 2.

This similarly applies to FIG. 4. That is, the phases of known information to be carried on odd-numbered subcarriers of the third known symbols of antennas 1, 2, and 3 are inverted, and the phases of known information to be carried on subcarriers of the first and second known symbols are not inverted.

The same applies to FIGS. 7 to 9, 10 to 12, and 13 to 15.

In this case, the arrangement of the transmitter is the same as FIG. 1, and the arrangement of the receiver is the same as FIG. 5.

Only the difference from the first to fourth embodiments will be explained below.

Figure 6:
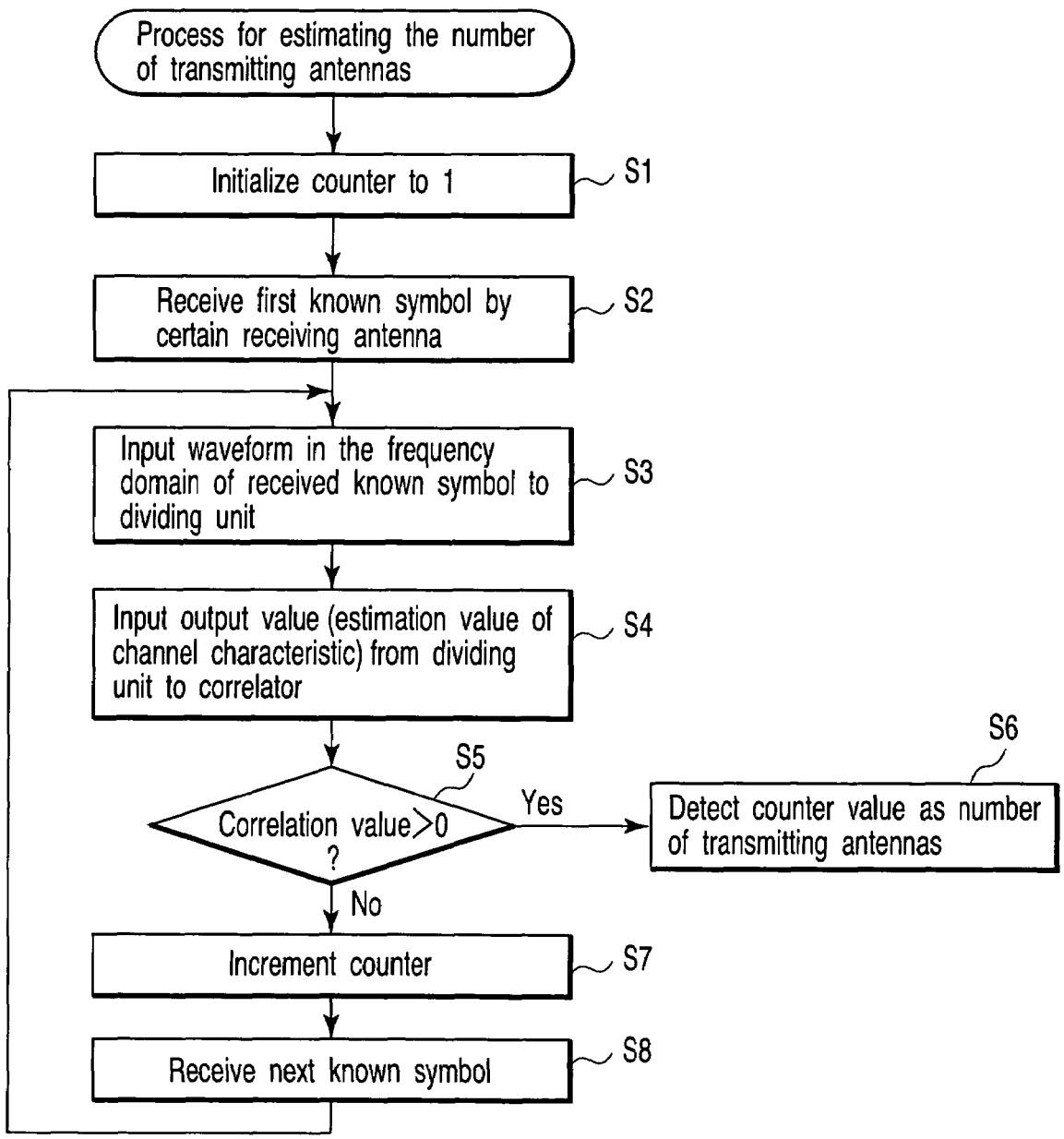
FIG. 6 is a flowchart for explaining a process for estimating the number of transmitting antennas in the receiver shown in FIG. 5.
Figure 18:
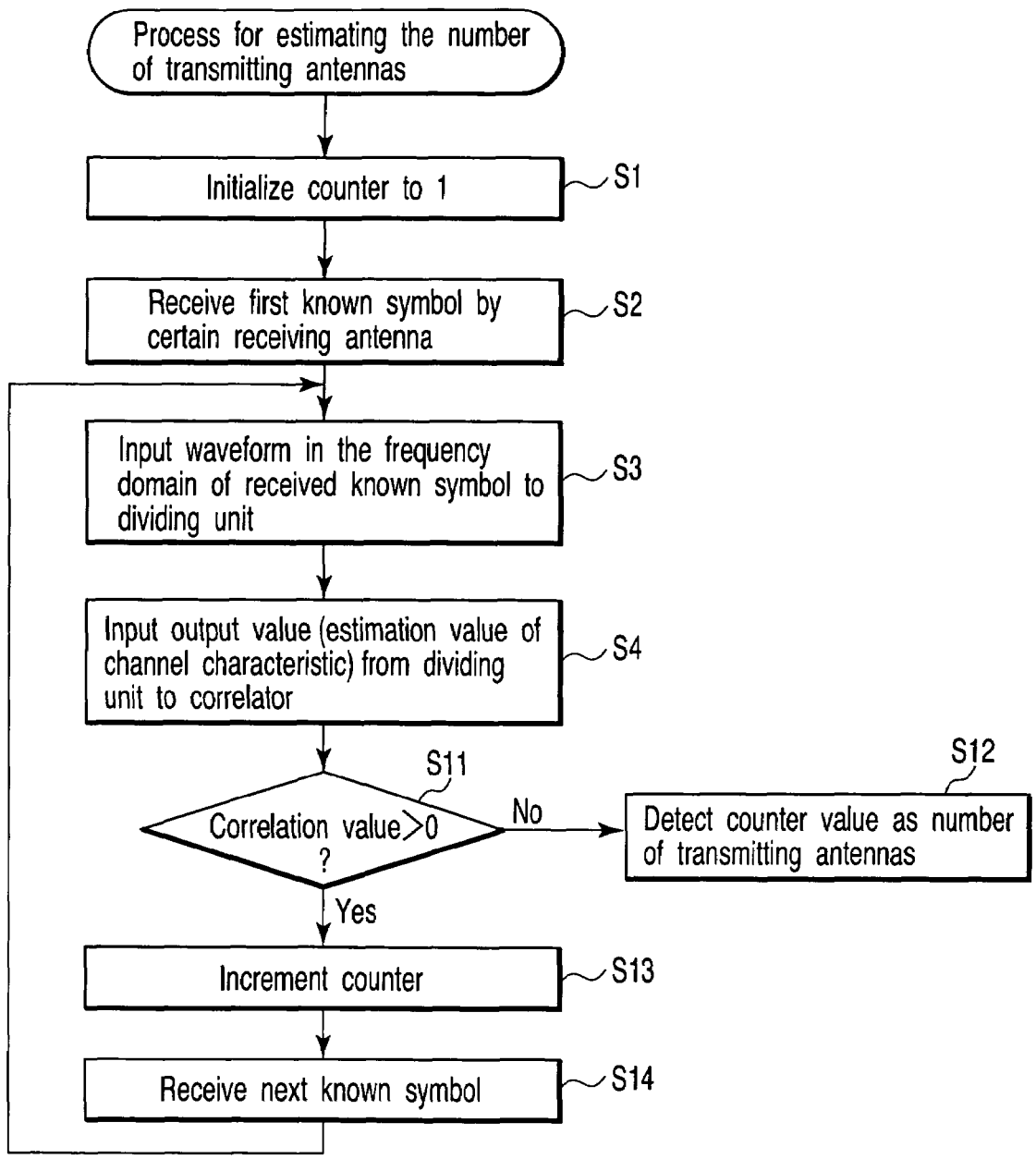
FIG. 18 is a flowchart for explaining a process for estimating the number of transmitting antennas in a receiver according to the fifth embodiment of the present invention.

In the algorithm of the transmitting antenna count estimating sequence shown in FIG. 6 performed by the receiver shown in FIG. 5, the processing from step S5 is different. That is, as shown in FIG. 18, if the correlation value calculated by a correlator 35-j is negative (step S11), the determination unit 36 determines that the currently received symbol is the last known symbol, and estimates the number of transmitting antennas on the basis of the number of known symbol patterns received so far and counted by the counter 37 (step S12). Since the number of known symbols of a known symbol sequence transmitted from each antenna is equal to the number of transmitting antennas, this counter value is an estimation value of the number of transmitting antennas. The MIMO signal processing unit 39 reproduces the data symbols by using the estimated number of transmitting antennas.

On the other hand, if the correlation value is positive in step S1, the counter 35 is incremented (step S13), and the channel characteristic corresponding to odd-numbered subcarriers, which is calculated by a dividing unit 30-j and stored in a memory 38-j, is multiplied by −1. The value is stored in the memory 38-j again, and the next known symbol is received (step S14). After that, the operations in steps S3, S4, and S11 to S14 are repeated whenever a new known symbol is received.

As described above, the transmitter according to the first to fifth embodiments transmits a plurality of known symbol sequences each including a plurality of known symbols by using a plurality of antennas. Each known symbol is carried on a plurality of subcarriers. Inversion/non-inversion of the phase of known information of each known symbol carried on one of two adjacent subcarriers of the subcarriers is controlled in accordance with the number of the known symbols and time position of the each of the known symbols;

In the known symbol sequence according to the first to third embodiments, subcarrier arrangements (allocations) of known symbols, i.e., the arrangements of a plurality of subcarriers on which known information of each of the known symbols carried, are different.

Also, the known symbol sequence according to the fourth embodiment includes identical known symbols whose known information and subcarrier arrangements on which the known information of each of the identical known symbols carried are the same.

In the transmitter according to the first to fourth embodiments, of known symbols in a known symbol sequence transmitted from each antenna, the phase of known information of each of the known symbols carried on one of two adjacent subcarriers of each known symbol except for the last known symbol is inverted, and the phase of known information of this last known symbol carried on each subcarrier is not inverted. Therefore, the receiver estimates the channel characteristic of a known symbol sequence received by each antenna. If the correlation between the channel estimation values of adjacent subcarriers has a positive value, the receiver determines that the end of the known symbol sequence is detected. The receiver can easily estimate the number of transmitting antennas from the number of known symbols received so far in each of which the correlation between the channel estimation values of adjacent subcarriers has a negative value.

In the transmitter according to the fifth embodiment, of known symbols in a known symbol sequence transmitted from each antenna, the phase of known information of each known symbol carried on one of two adjacent subcarriers of the last known symbol is inverted, and the phase of known information of each known symbol except for this last known symbol is not inverted. Therefore, the receiver estimates the channel characteristic of a known symbol sequence received by each antenna. If the correlation between the channel estimation values of adjacent subcarriers has a negative value, the receiver determines that the end of the known symbol sequence is detected. The receiver can easily estimate the number of transmitting antennas from the number of known symbols received so far in each of which the correlation between the channel estimation values of adjacent subcarriers has a positive value.

In each of the above embodiments as explained above, the receiving side can easily estimate the number of antennas used in transmission.

What is claimed is:

1. A wireless communication apparatus communicating by using a plurality of antennas, comprising:
    a first transmitting unit configured to transmit a known symbol sequence including a plurality of known symbols ordered in time by using the antennas, each of the known symbols having plural subcarriers on which plural known values are carried, the known symbols including (a) at least one inverted known symbol in which a phase of one of two known values carried on two subcarriers adjacent in frequency domain is inverted and a phase of the other of the two known values is not inverted, and (b) at least one non-inverted known symbol in which neither of phases of two known values carried on two subcarriers adjacent in frequency domain is inverted, time positions of the inverted known symbol and the non-inverted known symbol in the known symbol sequence being determined in accordance with the number of the known symbols in the known symbol sequence; and
    a second transmitting unit configured to transmit data symbols by using the antennas after the known symbol sequence is transmitted.

2. An apparatus according to claim 1, wherein the last known symbol of the known symbols is the non-inverted known symbol, and each known symbol of the known symbols except for the last known symbol is the inverted known symbol.

3. An apparatus according to claim 1, wherein the last known symbol of the known symbols is the inverted known symbol, and each known symbol of the known symbols except for the last known symbol is the non-inverted known symbol.

4. An apparatus according to claim 1, wherein the known symbols have different subcarrier arrangements in which positions of the subcarriers on which the known values are carried are different.

5. An apparatus according to claim 1, wherein the known symbol sequence includes identical known symbols whose subcarrier arrangements, in which positions of the subcarriers on which the known values are carried are arranged, are the same.

6. An apparatus according to claim 1, wherein the first transmitting unit includes:
- memory to store a plurality of known symbol patterns having different subcarrier arrangements in which positions of the subcarriers on which the known values are carried are different;
- timing generating unit configured to generate a timing signal indicating a timing at which the known symbol is to be transmitted; and
- selector to select a known symbol pattern to be used in the known symbol from the known symbol patterns in accordance with the timing signal.

7. A wireless communication apparatus comprising:
- receiving unit configured to receive a known symbol sequence and subsequent data symbols transmitted by a plurality of antennas, the known symbol sequence including a plurality of known symbols ordered in time, each of the known symbols having plural subcarriers on which plural known values are carried on, the known symbols including (a) at least one inverted known symbol in which a phase of one of two known values carried on two subcarriers adjacent in frequency domain is inverted and a phase of the other of the two known values is not inverted, and (b) at least one non-inverted known symbol in which neither of phases of the two known values carried on the two subcarriers adjacent in frequency domain is inverted, time positions of the inverted known symbol and the non-inverted known symbol in the known symbol sequence being determined in accordance with the number of the known symbols in the known symbol sequence;
- a first calculating unit configured to calculate a channel estimation value corresponding to each of the subcarriers, from each known symbol received;
- a second calculating unit configured to calculate, for each known symbol, a correlation value between two channel estimation values corresponding to the two subcarriers adjacent in frequency domain, to obtain a positive correlation value in the case of the non-inverted known symbol and to obtain a negative correlation value in the case of the inverted known symbol;
- an estimating unit configured to estimate the number of antennas, by counting the number of the known symbols received up to the last known symbol in the known symbol sequence, the last known symbol having one of the positive and the negative correlation values, and the known symbols other than the last known symbol in the known symbol sequence having the other of the positive and the negative correlation values; and
- a processing unit configured to process the data symbols received by using the each channel estimation value and the number of antennas estimated.

8. An apparatus according to claim 7, wherein the estimating unit estimates the number of antennas by counting the known symbols received up to the last known symbol having the positive correlation value, the known symbols other than the last known symbol in the known symbol sequence having the negative correlation value.

9. An apparatus according to claim 7, wherein the estimating unit estimates the number of antennas by counting the known symbols received up to the last known symbol having the negative correlation value, the known symbols other than the last known symbol in the known symbol sequence having the positive correlation value.

10. An apparatus according to claim 7, wherein the known symbol sequence includes identical known symbols whose subcarrier arrangements, in which positions of the subcarriers on which the known values are carried are arranged, are the same; and
- the first calculating unit includes a averaging unit configured to average waveforms in the frequency domain corresponding to the identical known symbols, to obtain a waveform averaged; and calculates the channel estimation value from the waveform averaged.

* * * * *